United States Patent
Kang et al.

(10) Patent No.: US 8,987,359 B2
(45) Date of Patent: Mar. 24, 2015

(54) FLAME RETARDANT POLYAMIDE RESIN COMPOSITION AND MOLDED ARTICLE USING SAME

(71) Applicant: Cheil Industries Inc., Gumi-si (KR)

(72) Inventors: Hyoung Taek Kang, Uiwang-si (KR); Eun Joo Lee, Uiwang-si (KR); Sang Hyun Hong, Uiwang-si (KR); Jong Cheol Lim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/913,796

(22) Filed: Jun. 10, 2013

(65) Prior Publication Data

US 2014/0275367 A1 Sep. 18, 2014

(30) Foreign Application Priority Data

Mar. 13, 2013 (KR) ........................ 10-2013-0026522

(51) Int. Cl.
*C08K 5/5313* (2006.01)
*C08L 77/06* (2006.01)

(52) U.S. Cl.
CPC ...................................... *C08L 77/06* (2013.01)
USPC ........... 524/126; 524/133; 524/147; 524/151; 524/153; 524/494

(58) Field of Classification Search
USPC .................. 524/126, 133, 147, 151, 153, 494
See application file for complete search history.

(56) References Cited

U.S. PATENT DOCUMENTS

| | | | |
|---|---|---|---|
| 5,191,019 A | 3/1993 | Dahl et al. | |
| 7,205,346 B2 * | 4/2007 | Harashina | 524/133 |
| 7,294,661 B2 | 11/2007 | Martens et al. | |
| 7,803,856 B2 | 9/2010 | Perego et al. | |
| 2001/0007888 A1 * | 7/2001 | Asano | 524/115 |
| 2005/0014874 A1 | 1/2005 | Hoerold et al. | |
| 2007/0054992 A1 | 3/2007 | Urata et al. | |
| 2009/0275683 A1 * | 11/2009 | Lee et al. | 524/133 |
| 2011/0275743 A1 * | 11/2011 | Ishii et al. | 524/106 |
| 2012/0016077 A1 * | 1/2012 | Kato et al. | 524/606 |

FOREIGN PATENT DOCUMENTS

| | | |
|---|---|---|
| JP | 52-012240 A | 1/1977 |
| JP | 02-123159 A | 5/1990 |
| JP | 05-005060 | 1/1993 |
| JP | 06-049356 A | 2/1994 |
| JP | 7-25897 | 3/1995 |
| JP | 2004-292755 A | 10/2004 |
| JP | 2005-036231 A | 2/2005 |
| JP | 2005-336473 A | 12/2005 |
| JP | 2007-507595 A | 3/2007 |
| JP | 2007-321032 A | 12/2007 |
| JP | 2007-536401 A | 12/2007 |
| KR | 10-2007-0115867 A | 12/2007 |

* cited by examiner

*Primary Examiner* — Peter Szekely
(74) *Attorney, Agent, or Firm* — Additon, Higgins & Pendleton, P.A.

(57) ABSTRACT

A flame retardant polyamide resin composition includes (A) about 40 to about 60% by weight of a crystalline polyamide resin, (B) about 10 to about 20% by weight of polyphenylene sulfide resin, (C) about 5 to about 15% by weight of flame retardant containing phosphinic acid metal slat compound, (D) about 20 to about 40% by weight of glass fiber and (E) about 0.1 to about 1% by weight of phosphite antioxidant. The flame retardancy polyamide resin composition can have excellent mechanical properties such as impact strength, flexural modulus, flexural strength and/or tensile strength and can exhibit reduced gas blistering on a surface of a specimen thereof.

12 Claims, No Drawings

FLAME RETARDANT POLYAMIDE RESIN COMPOSITION AND MOLDED ARTICLE USING SAME

CROSS-REFERENCE TO RELATED APPLICATION

This application claims priority under 35 USC Section 119 to and the benefit of Korean Patent Application No. 10-2013-0026522, filed Mar. 13, 2013, the entire disclosure of which is incorporated herein by reference.

FIELD OF THE INVENTION

The present invention relates to a flame retardant polyamide resin composition.

BACKGROUND OF THE INVENTION

Thermoplastic resins having high heat-resistance and chemical-resistance, such as aromatic polyamide resins, can be used in the production of various products such as electrical/electronic parts, automobile parts, optical parts and chemical appliance parts.

Aromatic polyamide resins, however, generally have poor flame retardancy. A halogen flame retardant can be added to achieve a flame retardancy of UL-94 V-0. Increasingly, however, regulations, such as the Restriction of the Use of Certain Hazardous Substance (RoHS) and Prohibition of the Certain Hazardous Substance (PoHS), prohibit the use of halogenated flame retardants in various products, such as electrical/electronic instrument parts.

US Publication No. 2007-0054992 discloses a polyamide resin composition including a non-halogen flame retardant. However, the polyamide resin composition can exhibit deteriorated heat-resistance and other mechanical properties, due to the use of the flame retardant in high amounts to obtain V-0 flame retardancy. In addition, the processing temperature can be increased, there can be increased gas emissions due to decomposition of the flame retardant, and there can be problems relating to corrosion of an injection molding machine and a mold.

In order to reduce the amount of flame retardant in polyamide resin compositions, the use of polyphenylene sulfide resin has been proposed. Polyphenylene sulfide resin, as a thermoplastic resin, can have excellent properties such as heat-resistance, dimensional stability, chemical resistance, flame retardancy, and processibility. Reinforced polyphenylene sulfide resin can replace metal materials used in precision parts, such as various optical parts or electrical/electronic instrument parts.

Adding polyphenylene sulfide resin to the polyamide resin composition can reduce the amount of the flame retardant required. However, this does not prevent gas blister formation on a surface of a product due to out-gassing when the composition is processed at high temperatures. Also, if a phenol antioxidant is used, there can be increased gas blister formation on a surface due to moisture absorption.

SUMMARY OF THE INVENTION

The present invention provides a flame retardant polyamide resin composition which can exhibit reduced gas emissions (reduced out-gassing) and thus can exhibit reduced gas blister formation on a surface.

The present invention also provides a flame retardant polyamide resin composition that can have excellent mechanical properties such as impact strength, flexural modulus, flexural strength and/or tensile strength.

The present invention further provides molded articles which are prepared from the flame retardant polyamide resin composition.

A flame retardancy polyamide resin composition according to the present invention comprises (A) about 40 to about 60% by weight of a crystalline polyamide resin. (B) about 10 to about 20% by weight of a polyphenylene sulfide resin, (C) about 5 to about 15% by weight of a phosphinic acid metal salt flame retardant, (D) about 20 to about 40% by weight of a glass fiber and (E) about 0.1 to about 1% by weight of a phosphite antioxidant.

The crystalline polyamide resin (A) can be a semi-aromatic polyamide resin including a benzene ring in the main chain thereof and can have a melting point of about 290 to about 320° C.

Examples of the crystalline polyamide resin (A) can include polytetramethylene adipamide (PA 46), polycaproamide/polyhexamethylene terephthalamide copolymer (PA6/6T), polyhexamethylene adipamide/polyhexamethylene terephthalamide copolymer (PA66/6T), polyhexamethylene adipamide/polyhexamethylene isophthalamide copolymer (PA66/6I), polyhexamethylene terephthalamide/polyhexamethylene isophthalamide copolymer (PA6T/6I), polyhexamethylene terephthalamide/polydodecaneamide copolymer (PA6T/12), polyhexamethylene adipamide/polyhexamethylene terephthalamide/polyhexamethylene isophthalamide copolymer (PA66/6T/6I), polyxylylene adipamide (PA MXD6), polyhexamethylene terephthalamidelpoly 2-methylpentamethylene terephthalamide copolymer (PA 6T/M5T), polynonamethylene terephthalamide (PA 9T) and the like, and combinations thereof.

The polyphenylene sulfide resin (B) can include about 70 mol % or more of a repeating unit represented by following Chemical Formula 1:

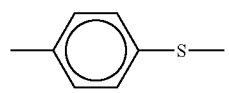

[Chemical Formula 1]

The composition may include additional flame retardants, such as but not limited to aromatic phosphoric acid ester compounds, nitrogen-containing compounds such as melamine and melamine cyanurate, nitrogen-phosphorous-containing compounds such as melamine pyrophosphate and melamine polyphosphate, and the like, and combinations thereof.

The glass fiber (D) can be a circular glass fiber. The average diameter of the glass fiber can be about 9 to about 12 μm, and the average length of the glass fiber can be about 2 to about 4 mm. Further, the surface of the glass fiber (D) may be treated, for example, with a urethane compound.

Examples of the phosphite antioxidant (E) can include triphenyl phosphite, tris(nonyl phenyl) phosphite, triisodecyl phosphite, diphenyl-iso-octyl-phosphite, bis(2,6-di-tert-butyl-4-methyphenyl)pentaerythritol diphosphite, tris(2,4-di-tert-butylphenyl) phosphite and the like, and combinations thereof.

The composition further may comprise a phenol antioxidant.

The flame retardancy polyamide resin composition further can include one or more additives. Examples of the additives include release agents, lubricants, compatibilizing agents, impact reinforcing agents, plasticizers, nucleating agents, colorants, and the like, and combinations thereof.

The molded article according to the present invention can be prepared from the flame retardant polyamide resin composition.

The flame retardant polyamide resin composition according to the present invention can have excellent mechanical properties such as impact strength, flexural modulus, flexural strength and/or tensile strength, and can exhibit reduced gas blisters on a surface of a product because gas emissions (out-gassing) can be reduced.

DETAILED DESCRIPTION OF THE INVENTION

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The flame retardant polyamide resin composition according to the present invention can exhibit reduced gas blisters on a surface due to reduced gas emissions (out-gassing), and can have improved mechanical properties such as impact strength, flexural modulus, flexural strength and/or tensile strength.

The flame retardant polyamide resin composition comprises (A) crystalline polyamide resin, (B) polyphenylene sulfide resin. (C) phosphinic acid metal salt flame retardant, (D) glass fiber, and (E) phosphite antioxidant. Hereinafter, each component will be described in more detail.

(A) Crystalline Polyamide Resin

The crystalline polyamide resin (A) of the present invention may be prepared by any conventional method well known to those skilled in the art, and can include commercially available products without restriction. Also, the crystalline polyamide resin may be a semi-aromatic polyamide resin.

The crystal polyamide resin (A) is a structure having benzene rings in a main chain thereof. The crystalline polyamide resin (A) can be prepared by condensation polymerization of dicarboxylic acid including about 10 to about 100 mole % of an aromatic dicarboxylic acid and an aliphatic and/or alicyclic diamine. The aliphatic and/or alicyclic diamine can have 4 to 20 carbon atoms.

Examples of the dicarboxylic acid include without limitation terephthalic acid represented by the following Chemical Formula 2, isophthalic acid represented by the following Chemical Formula 3, and the like, and combinations thereof. The dicarboxylic acid includes benzene rings that are incorporated into the main chain of the crystalline polyamide resin.

[Chemical Formula 2]

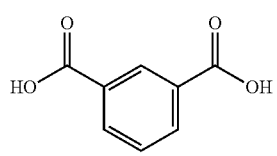

Isophthalic acid, IPA

[Chemical Formula 3]

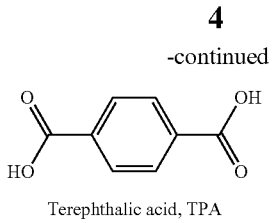

Terephthalic acid, TPA

Exemplary crystalline polyamide resins (A) may include without limitation polyamide resins represented by Chemical Formula 4 below:

[Chemical Formula 4]

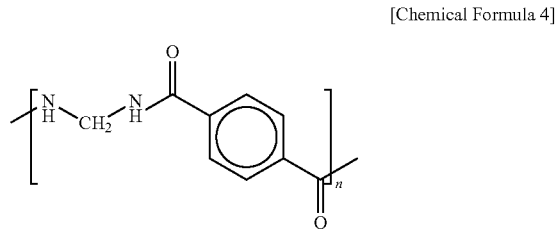

wherein, m is an integer from 4 to 12, and n is an integer from 50 to 500.

Examples of the crystalline polyamide can include without limitation PA6T wherein m=6, which is prepared by condensation polymerization of hexamethylene diamine and terephthalic acid, PA10T, wherein m=10, which is prepared by condensation polymerization of 1,10-decane diamine and terephthalic acid, and the like, and combinations thereof.

Further examples of the crystal polyamide resin (A) can include, without limitation, polytetramethylene adipamide (PA46), polycaproamide/polyhexamethylene terephthalamide copolymer (PA66/6T), polyhexamethylene adipamide/polyhexamethylene terephthalamide copolymer (PA66/6T), polyhexamethylene adipamide/polyhexamethylene isophthalamide copolymer (PA66/6I), polyhexamethylene terephthalamide/polyhexamethylene isophthalamide copolymer (PA6T/6I), polyhexamethylene terephthalamide/polydodecaneamide copolymer (PA6T/12), polyhexamethylene adipamide/polyhexamethylene terephthalamide/polyhexamethylene isophthalamide copolymer (PA66/6T/6I), polyxylylene adipamide (PAMXD6), polyhexamethylene terephthalamidelpoly 2-methylpentamethylene terephthalamide copolymer (PA6T/M5T), polynonamethylene terephthalamide (PA9T), polydecamethylene terephthalamide (PA10T), and the like, and combinations thereof. For example, polyhexamethylene adipamide/polyhexamethylene terephthalamide copolymer (PA66/6T) can be used.

The crystal polyamide resin (A) may have a melting point of about 290° C. or more, for example about 290 to about 320° C., which can be measured using differential scanning calorimetry (DSC) in accordance with known techniques. Also, the crystal polyamide resin (A) may have a crystallization temperature of about 250 to about 300° C., for example about 260 to about 290° C., which can also be measured using DSC. In addition, the crystal polyamide resin (A) may have a glass transition temperature of about 80 to about 100° C., for example about 85 to about 95° C., which can also be measured using DSC. The SCAN speed of the DSC can include heating at 20° C./min, and cooling at 10° C./min. When the polyamide resin has a melting point, crystallization temperature and/or glass transition temperature within the above ranges, the crystalline polyamide resin (A) may have excellent heat-resistance.

The flame retardant polyamide resin composition may include the crystalline polyamide resin (A) in an amount of about 40 to about 60% by weight, based on the total weight (100% by weight) of the flame retardant polyamide resin composition. In some embodiments, the flame retardant polyamide resin composition may include the crystalline polyamide resin (A) in an amount of about 20, 21, 22, 23, 24, 25, 26, 27, 28, 29, 30, 31, 32, 33, 34, 35, 36, 37, 38, 39, or 40% by weight. Further, according to some embodiments of the present invention, the crystalline polyamide resin (A) may be present in an amount of from about any of the foregoing amounts to about any other of the foregoing amounts.

If the amount of the crystalline polyamide resin (A) is below about 40% by weight, colorability of the flame retardant polyamide resin composition can be impaired, and the flame retardant polyamide composition can also be brittle and thus easily fractured. If the amount of the crystalline polyamide resin (A) is greater than about 60% by weight, the flame retardant must be used in a larger amount to obtain flame retardancy, which can deteriorate other properties.

(B) Polyphenylene Sulfide Resin

The polyphenylene sulfide resin (B) can have heat-resistance at a high temperature, as well as maintain similar features at room temperature and at a low temperature of −50° C.

Further, the polyphenylene sulfide resin (B) can have excellent dimensional stability over a wide temperature range and creep resistance. Also, the polyphenylene sulfide resin (B) is non-toxic, safe, and also has flame retardancy. Further, polyphenylene sulfide resin (B) having a relatively low viscosity can be used as a resin in the preparation of a highly filled resin.

The polyphenylene sulfide resin (B) can be a linear polyphenylene sulfide resin including about 70 mol % or more of a repeating unit having following Chemical Formula 1.

[Chemical Formula 1]

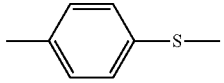

When the polyphenylene sulfide resin (B) includes a repeating unit of Chemical Formula 1 in an amount of about 70 mol % or more, the degree of crystallization can be high, and the resin can have excellent heat-resistance, chemical resistance, and strength. Japanese Publication Patent So52-12240, the entire disclosure of which is incorporated herein by reference, discloses a typical manufacturing method of linear polyphenylene sulfide resin with the above repeating unit.

The polyphenylene sulfide resin (B) can further include polyphenylene sulfide resin with up to about 50 mol %, for example up to about 30 mol %, of other repeating units. The other repeating units can be represented by the following Chemical Formulas.

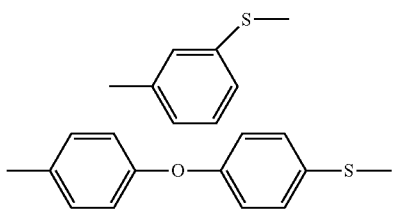

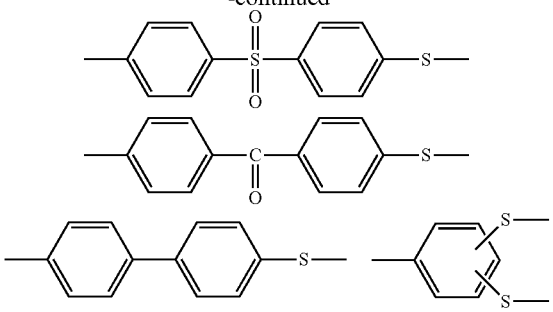

In the above Chemical Formulas, R is C1-C10 alkyl, nitro group, phenyl, C1-C10 alkoxy carboxy group, or carboxylate group.

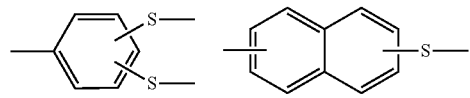

An exemplary polyphenylene sulfide resin (B) can be formed by the reaction of p-dichlorobenzene and sodium sulfide A polyphenylene sulfide resin (B) with a low viscosity may be used to manufacture complex shaped products having high thermal conductivity, because it can be more easily highly filled with thermally conductive inorganic filler.

In exemplary embodiments, the polyphenylene sulfide resin (B) can have a weight-average molecular weight of about 3,000 to about 50,000 g/mol, for example about 5.000 to about 30,000 g/mol, to have a low viscosity. When the polyphenylene sulfide resin (B) has a weight-average molecular weight within the above range, stability can be good, and if the composition is extrusion or injection molded, there may be little to no concern of curing reaction between resins.

The flame retardant polyamide resin composition may include the polyphenylene sulfide resin (B) in an amount of about 10 to about 20% by weight, for example about 10 to about 15% by weight, based on the total weight (100% by weight) of the flame retardant polyamide resin composition. In some embodiments, the flame retardant polyamide resin composition may include the polyphenylene sulfide resin (B) in an amount of about 10, 11, 12, 13, 14, 15, 16, 17, 18, 19, or 20% by weight. Further, according to some embodiments of the present invention, the polyphenylene sulfide resin (B) may be present in an amount of from about any of the foregoing amounts to about any other of the foregoing amounts.

If the flame retardant polyamide resin composition includes the polyphenylene sulfide resin (B) in an amount in the above range, gas emissions can be decreased due to reduction of the amount of flame retardant, and the composition can have a good balance of properties such as mechanical properties, heat resistance and processibility.

If the amount of the polyphenylene sulfide resin (B) is less than about 10% by weight, the flame retardancy can be deteriorated. If the amount of the flame retardant is increased to improve flame retardancy, other properties of the flame retardant polyamide resin composition can be deteriorated due to thermal decomposition of the flame retardant. In addition, if the amount of the polyphenylene sulfide resin (B) is greater than about 20% by weight, colorability and CTI (electrical property) can be deteriorated.

(C) Phosphinic Acid Metal Salt Flame Retardant

The phosphinic acid metal salt compound of the present invention can include a compound, or a combination of compounds, having a structure represented by the following Chemical Formula 5 and/or 6.

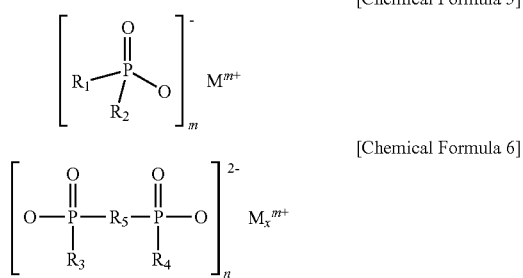

[Chemical Formula 5]

[Chemical Formula 6]

wherein in Chemical Formula 5 and 6, $R_1$, $R_2$, $R_3$, and $R_4$ can be the same or different and are each independently linear or branched $C_1$ to $C_6$ alkyl, $C_6$ to $C_{10}$ cycloalkyl, or $C_6$ to $C_{10}$ aryl, for example methyl, ethyl, propyl, isopropyl, butyl, pentyl or phenyl;

$R_5$ can be $C_1$ to $C_{10}$ alkylene, $C_6$ to $C_{10}$ arylene, $C_1$ to $C_{10}$ alkyl substituted $C_6$ to $C_{10}$ arylene or $C_6$ to $C_{10}$ aryl substituted $C_1$ to $C_{10}$ alkylene, for example methylene, ethylene, propylene, butylene, pentylene, octylene, dodecylene, phenylene, naphthylene, methyl phenylene, ethyl phenylene, butyl phenylene, methyl naphthylene, ethyl naphthylene, butyl naphthylene, phenyl methylene, phenyl ethylene, phenyl propylene or phenyl butylene;

M can be calcium ion, magnesium ion, aluminum ion or zinc ion, for example aluminum ion or zinc ion;

m can be an integer from 2 to 3;

n can be 1 or 3; and x can be 1 or 2.

Examples of the phosphinic acid metal salt compound according to the present invention can include without limitation aluminum diethylphosphinate, aluminum methylethylphosphinate, and the like, and combinations thereof.

The flame retardant polyamide resin composition can further include a flame retardant other than the phosphinic acid metal salt compound. Examples of other flame retardants that can be used include without limitation aromatic phosphoric acid ester compounds, nitrogen-containing compounds such as melamine, melamine cyanurate, and the like, nitrogen-phosphorous-containing compounds such as melamine pyrophosphate, melamine polyphosphate, and the like, and combinations thereof.

The aromatic phosphoric acid ester compound is not specially limited. Exemplary aromatic phosphoric acid ester compounds are represented by the following Chemical Formula 7:

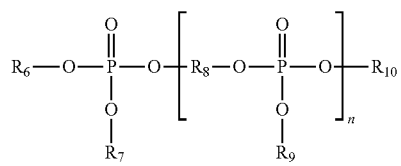

wherein, $R_5$, $R_7$, $R_9$ and $R_{10}$ are the same or different and are each independently $C_6$ to $C_{20}$ aryl or $C_1$ to $C_{14}$ alkyl-substituted $C_6$ to $C_{20}$ aryl, $R_8$ is derived from a dialcohol such as resorcinol, hydroquinol, bisphenol-A, or bisphenol-S, and n can be 0 to 5.

Examples of aromatic phosphate ester compound wherein n is 0 can include, without limitation, triphenylphosphate, tricresylphosphate, cresyldiphenylphosphate, trixylylphosphate, tri(2,4,6-trimethylphenyl)phosphate, tri(2,4-ditertiarybutylphenyl)phosphate, tri(2,6-ditertiarybutylphenyl) phosphate, and the like, and combinations thereof.

Examples of aromatic phosphate ester compound wherein n is 1 can include, without limitation, resorcinol bis(diphenylphosphate), hydroquinol bis(diphenylphosphate), bisphenol A-bis(diphenylphosphate), resorcinol his (2,6-ditertiarybutylphenylphosphate), hydroquinol his (2,6-dimethylphenylphosphate), and the like, and combinations thereof.

The aromatic phosphate ester compound wherein n is 2 can exist in a form of a mixture of oligomers.

The aromatic phosphoric acid ester compound according to the present invention can use all types of aromatic phosphoric acid ester compounds other than the exemplary ones above, and can be used singly or a combination with two more kinds.

The aromatic phosphoric acid ester compound according to the present invention can further include other phosphorous-containing compounds such as phosphonates, phosphazenes, and the like, and combinations thereof.

The flame retardant polyamide resin composition may include the phosphinic acid metal salt flame retardant (C) in an amount of about 5 to about 15% by weight, based on the total weight (100% by weight) of the flame retardant polyamide resin composition. In some embodiments, the flame retardant polyamide resin composition may include the phosphinic acid metal salt flame retardant (C) in an amount of about 5, 6, 7, 8, 9, 10, 11, 12, 13, 14, or 15% by weight. Further, according to some embodiments of the present invention, the phosphinic acid metal salt flame retardant (C) may be present in an amount of from about any of the foregoing amounts to about any other of the foregoing amounts.

If the flame retardant polyamide resin composition includes the phosphinic acid metal salt flame retardant (C) in an amount within the above range, processibility can be excellent, and there can be minimal or no gas emissions during injection molding.

If the amount of the phosphinic acid metal salt flame retardant (C) is less than about 5% by weight, flame retardancy of the composition can be deteriorated. If the amount of the phosphinic acid metal salt flame retardant (C) is greater than about 15% by weight, tensile strength and flexural strength can be deteriorated.

(D) Glass Fiber

The glass fiber can have an average diameter of about 9 to about 12 μm and an average length of about 2 to about 4 mm. Suitable glass fiber is commercially available. If the glass fiber has a diameter and length within the above ranges, it can be easy to add into the extruder, and impact reinforcing effects can be improved.

Examples of the glass fiber can include, without limitation, basalt fiber, fiber prepared from biomass, and the like, and combinations thereof. The cross-sectional shape of the glass fiber is not limited and the glass fiber can be circular-shaped, elliptical-shaped, rectangular-shaped, and/or dumbbell-shaped.

A glass fiber with a circular cross sectional shape can have a cross-sectional aspect ratio of 1. The aspect ratio is defined as the ratio to the longest diameter to the smallest diameter. A glass fiber with an elliptical cross sectional shape can have a cross-sectional aspect ratio of greater than 1, for example a cross-sectional aspect ratio of about 1.5 or greater, and as another example a cross-sectional aspect ratio of about 2 to about 8.

A combination of glass fibers with different cross-sectional shapes can also be used. For example, a mixture of glass fiber with a circular cross-sectional shape and glass fiber with an elliptical cross-sectional shape can be used. The mixture of circular and elliptical glass fibers can be used in a weight ratio of about 1:4 to about 4:2, for example about 1:2 to about 2:1. If the circular and elliptical glass fibers are mixed in a weight ratio within the above range, dimensional stability of the polyamide resin composition can be improved.

Further, in order to improve bonding between the glass fiber and the resin, the surface of the glass fiber can be surface treated. Depending on the type of these surface treatments, fluidity and impact strength of polyamide composition can be changed.

Examples of these surface treatments can include without limitation urethane compounds. Urethane compounds are commercially available.

Conventional methods for treating the surface of glass fiber with urethane compounds can be used. Examples include without limitation screen-printing, printing, spin-coating, dipping and/or ink-jetting.

A glass fiber surface-treated with urethane compound can have a low absorption rate of moisture since it has reduced organic content, and further can reduce gas blisters on a surface of a product due to reduced gas emissions when processed at a high temperature. In addition, mechanical strength can be excellent due to good adhesion.

The flame retardant polyamide resin composition may include the glass fiber (D) in an amount of about 20 to about 40% by weight, for example about 25 to about 35% by weight, based on the total weight (100% by weight) of polyamide resin composition. In some embodiments, the flame retardant polyamide resin composition may include the glass fiber (D) in an amount of about 20, 21, 22, 23, 24, 25, 26, 27, 28, 29, 30, 31, 32, 33, 34, 35, 36, 37, 38, 39, or 40% by weight. Further, according to some embodiments of the present invention, the glass fiber (D) may be present in an amount of from about any of the foregoing amounts to about any other of the foregoing amounts.

If the flame retardant polyamide resin composition includes the glass fiber (D) in an amount within the above range, flexural modulus and heat resistance of the resin composition can be improved, and excellent moldability can be obtained, due to excellent flowability.

If the amount of the glass fiber (D) is less than about 20% by weight, the tensile strength can be deteriorated. If the amount of the glass fiber (D) is greater than about 40% by weight, the fluidity can be deteriorated.

(E) Phosphite Antioxidant

In the present invention, the phosphite compound is used as an antioxidant. The phosphite antioxidant (E) can have various properties such as low moisture absorption, low gas emissions due to high thermal stability, and minimal or no out-gassing since the phosphite compound does not decompose at a high temperature. As a result, gas blisters on a surface can be reduced.

Examples of the phosphite antioxidant (E) can include without limitation triphenyl phosphite, tris(nonyl phenyl) phosphite, triisodecyl phosphite, diphenyl-iso-octyl-phosphite, bis(2,6-di-tera-butyl-4-methylphenyl)pentaerythritol diphosphite(Bis(2,6-di-tert-butyl -4-methyphenyl)pentaerythritol diphosphite), tris(2,4-di-tera-butylphenyl)phosphite(Tris(2,4-di-tert-butylphenyl)phosphite), and the like, and combinations thereof.

The flame retardant polyamide resin composition may include the phosphite antioxidant (E) in amount of about 0.1 to about 1% by weight, for example about 0.1 to about 0.3% by weight, based on the total weight (100% by weight) of the flame retardant polyamide resin composition. In some embodiments, the flame retardant polyamide resin composition may include the phosphite antioxidant (E) in an amount of about 0.1, 0.2, 0.3, 0.4, 0.5, 0.6, 0.7, 0.8, 0.9, or 1% by weight. Further, according to some embodiments of the present invention, the phosphite antioxidant (E) may be present in an amount of from about any of the foregoing amounts to about any other of the foregoing amounts.

If the phosphite antioxidant (E) is included in an amount of less than about 0.1% by weight, it can be difficult to show the feature by volatilization during processing. If the phosphite antioxidant (E) is included in an amount of greater than about 1% by weight, out-gassing may occur.

(F) Other Additives

The resin composition according to the present invention can further include one or more other additives. Examples of the additives can include without limitation antioxidants, lubricants, flame retardants, thermal stabilizers, inorganic additives, pigments, dyes, release agents, compatibilizing agents, impact reinforcing agents, plasticizers, nucleating agents, and the like, and combinations thereof. The additive can be included in an amount of about 0.1 to about 0.7 parts by weight, based on about 100 parts by weight of the resin composition.

The resin composition according to the present invention can be prepared by any method known to person having ordinary skill in the art. For example, after mixing components of the present invention and additives at the same time, the resin composition according to the present invention can be made into pellets by melting extrusion into extrusion machine.

Molded Article

The present invention also relates to articles made from the foregoing thermoplastic resin composition. The molding method is not particularly limited, and the resin composition can be molded using injection molding or casting molding. These molding methods can be accomplished by person having ordinary skill in the art.

The molded article according to the present invention can have an Izod impact strength of about 6 to about 7 kgf·cm/cm, wherein the Izod impact strength is measured with ⅛ inch specimens in accordance with ASTM D256. For example, the Izod impact strength can be about 6.4, about 6.8, about 6.2, or about 6.5 kgf·cm/cm when ⅛ inch specimens are evaluated in accordance with ASTM D256.

The molded article according to the present invention can have a flexural modulus of about 100,000 to about 106,000 kgf/cm², wherein the flexural modulus is measured in accordance with ASTM D256. For example, the flexural modulus evaluated in accordance with ASTM D256 can be about 103,800, about 101,000, about 102,500, or about 105,500 kgf/cm².

The molded article according to the present invention can have a flexural strength of about 2,200 to about 2,400 kgf/cm², wherein the flexural strength is measured in accordance with ASTM D790. For example, the flexural strength evaluated in accordance with ASTM D790 can be about 2,240, about 2,310, about 2,230, or about 2,330 kgf/cm².

The molded article according to the present invention can have a tensile strength of about 1,400 to about 1,800 kgf/cm², wherein the tensile strength is measured in accordance with ASTM D638. For example, the tensile strength evaluated in accordance with ASTM D638 can be about 1.750, about 1,700, about 1,680, or about 1.740 kgf/cm².

The molded article according to the present invention can have a moisture percentage of about 3% or less, wherein the moisture percentage is measured for injection molded specimens having a size of 90 mm×50 mm×1 mm kept at a humidity of 85% and a temperature of 85° C. for 24 hours or 48 hours. For example, the moisture percentage of injection molded specimens can be about 2.69%, about 2.58%, about 2.62% or about 2.61% measured after being maintained at a humidity of 85% and a temperature of 85° C. for 24 hours, and the moisture percentage of injection molded specimens can be about 2.35%, about 2.50%, about 2.45%, or about 2.41% after being maintained at a humidity of 85% and a temperature of 85° C. for 48 hours.

The molded article according to the present invention can have a weight loss rate of about 6.2 to about 7.1%, wherein the weight loss rate is determined under a $N_2$ atmosphere by heating a specimen from 30° C. to 120° C. at a heating rate of 120° C./min, maintaining the specimen under isothermal conditions for 20 minutes in order to exclude the influence of water, and then heating the specimen from 120° C. to 350° C. to at a heating rate of 350° C./min, and maintaining the specimen under isothermal conditions for 30 minutes using Q5000 (product name) as a thermogravimetric analyzer (TGA) (thermogravimetric analysis) manufactured by TA. For example, the weight loss rate of the molded article can be about 6.3, about 6.7, about 7.1 or about 6.2%.

The molded article according to the present invention can have a gas blister on surface of 1 to 3 grades, wherein the gas blister on a product surface is measured for injection molded specimens having a size of 90 mm×50 mm×1 mm maintained at a relative humidity of 85% and a temperature of 85° C. for 24 hours or 48 hours measured in accordance with the IPC/JEDEC J-STD-020D standard for IR Reflow equipment. For example, the molded article can have 2 or 3 grades for 24 hours, and the molded article can have 1 or 3 grades for 48 hours.

The molded article according to the present invention can have an excellent feature of minimal or no gas blistering on a surface. Also, the flame retardant polyamide resin composition of the present invention can be used for various electrical/electronic parts or automobile parts, because the flame retardant polyamide resin composition can have excellent impact strength, flexural modulus, flexural strength and tensile strength, can have a good appearance, and can have environmentally-friendly flameproof properties. For example, the flame retardant polyamide resin composition can be used in connector, socket, connector box, memory, breaker, and the like.

The present invention may be better understood by reference to the following examples that are intended for the purpose of illustration and not to be construed as in any way limiting the scope of the invention.

EXAMPLES

The components of the Examples and Comparative Examples are prepared in the following fashion.

(A) Crystalline Semi-Aromatic Polyamide Resin

A high heat-resistance modified nylon including benzene rings in the main chain, polyhexamethylene adipamide/polyhexamethylene terephthalamide copolymer (PA66/PA6T) (A6000 (product name) manufactured by Solvay) is used.

(B) Polyphenylene Sulfide Resin

Polyphenylene sulfide resin which has a melting index (MI) of 200 to 500 g/10 min at 316° C., under a 5 kg lord manufactured by Deyang Science & Technology (China) is used.

(C) Phosphinic Acid Metal Salt Flame Retardant

Aluminum diethylphosphinate Exolit OP-1240 manufactured by Clariant is used.

(D) Glass Fiber (D1) A glass fiber with a diameter of 10 μm and a chop length of 3 μm and which is surface-treated with a non-urethane compound commercially available as 952 (product name) from Owens Corning is used.

(D2) A glass fiber having a diameter of 10 μm and a chop length of 3 μm commercially available as T-251H (product name) surface-treated with urethane compound from Nippon Electric Glass is used.

(E) Antioxidant (E1) GA-80 (product name) which is an antioxidant (hindered phenol) manufactured by Sumitomo is used.

(E2) ADK STAB PEP-36 (product name) which is an antioxidant (phosphite) manufactured by Ashai Denka is used.

(E3) ADK STAB AO-412S (product name) which is an antioxidant (thioester-based) manufactured by Ashai Denka is used.

(E4) H10 (product name) which is an antioxidant (hindered phenol) manufactured by Bruggemann is used.

(E5) H175 (product name) which is an antioxidant (hindered phenol & phosphite mixture) manufactured by Bruggemann is used.

Examples 1 to 5 and Comparative Examples 1 to 5

The resin compositions according to Examples 1 to 5 and Comparative Examples 1 to 5 are prepared using the components as shown in Table 1.

The components as shown in Table 1 are mixed using a normal mixer. Then the mixture is put into a twin extruder with L/D=45, ¢=44. The mixture is prepared as a resin composition in pellet form through the twin extruder. The specimens for evaluation of properties are prepared using a 10 oz injection machine at 330° C.

In Table 1, the basis of the amounts of each component is % by weight, based on 100% by weight of the total (A), (B), (C), (D) and (E).

TABLE 1

|  |  | Examples | | | | | Comparative Examples | | | | |
| --- | --- | --- | --- | --- | --- | --- | --- | --- | --- | --- | --- |
|  |  | 1 | 2 | 3 | 4 | 5 | 1 | 2 | 3 | 4 | 5 |
|  | (A) | 48.8 | 48.8 | 48.9 | 48.5 | 48 | 49 | 48.8 | 48.8 | 48.8 | 48.8 |
|  | (B) | 13 | 13 | 13 | 13 | 13 | 13 | 13 | 13 | 13 | 13 |
|  | (C) | 8 | 8 | 8 | 8 | 8 | 8 | 8 | 8 | 8 | 8 |
| (D) | (D1) | — | — | — | — | — | — | — | — | — | 30 |
|  | (D2) | 30 | 30 | 30 | 30 | 30 | 30 | 30 | 30 | 30 | — |

TABLE 1-continued

|     |      | Examples | | | | | Comparative Examples | | | | |
| --- | ---- | --- | --- | --- | --- | --- | --- | --- | --- | --- | --- |
|     |      | 1 | 2 | 3 | 4 | 5 | 1 | 2 | 3 | 4 | 5 |
| (E) | (E1) | — | — | — | — | — | — | 0.2 | — | — | — |
|     | (E2) | 0.2 | — | 0.1 | 0.5 | 1 | — | — | — | — | — |
|     | (E3) | — | — | — | — | — | — | — | — | 0.2 | — |
|     | (E4) | — | — | — | — | — | — | — | 0.2 | — | — |
|     | (E5) | — | 0.2 | — | — | — | — | — | — | — | — |

Properties of the specimens obtained by a composition as described above are measured with following methods. The results are shown in Table 2.

Methods for Measuring Physical Properties of Specimens (1) Impact strength (kgf·cm/cm): Impact strength of specimens with a thickness of ⅛" is measured in accordance with ASTM D256.

(2) Flexural modulus (kgf/cm$^2$): Flexural modulus is measured in accordance with ASTM D790.

(3) Flexural strength (kgf/cm$^2$): Flexural strength is measured in accordance with ASTM D790.

(4) Tensile strength (kgf/cm$^2$): Tensile strength is measured in accordance with ASTM D638.

(5) Moisture percentage (%): Weight gain rate is measured for injection molded specimens (size: 90 mm×50 mm×1 mm) maintained at a relative humidity of 85% and a temperature of 85° C., for 24 hours or 48 hours.

(6) High-temperature weight loss rate (%): the weight loss rate is measured under a $N_2$ atmosphere, by heating a specimen from 30° C. to 120° C. at a heating rate of 120° C./min, maintaining at isothermal conditions for 20 minutes in order to exclude the influence of water, and then heating from 120° C. to 350° C. at a heating rate of 350° C./min, and maintaining at isothermal conditions for 30 minutes using Q5000 (product name), a thermogravimetric analyzer manufactured by TA.

(7) Flame resistance: The flame resistance is measured with specimens having a thickness of 0.4 mm in accordance with UL 94 VB.

(8) Frequency of Gas blister on a surface: Frequency of Gas blister on a surface is measured for molded specimens having a size of 90 mm×50 mm×1 mm maintained at a relative humidity of 85% and a temperature of 85° C. for 24 hours or 48 hours measured in accordance with the IPC/JEDEC J-STD-020D standard for IR Reflow equipment. The lower number is a good grade.

Number of Blisters X: None occurred

Number of Blisters below 5: 1 grade

Number of Blisters of more than or equal to 5 and below 10: 2 grade

Number of Blisters of more than or equal to 10 and below 20: 3 grade

Number of Blisters of more than or equal to 20 and below 40: 4 grade

TABLE 2

| | | Examples | | | | | Comparative Examples | | | | |
| --- | --- | --- | --- | --- | --- | --- | --- | --- | --- | --- | --- |
| | | 1 | 2 | 3 | 4 | 5 | 1 | 2 | 3 | 4 | 5 |
| Impact Strength | ⅛" | 6.4 | 6.8 | 6.2 | 6.6 | 6.5 | 6.3 | 6.3 | 6.3 | 6.6 | 5.1 |
| Flexural Modulus | 2.8 mm/min | 103800 | 101000 | 102500 | 105200 | 105500 | 109300 | 104500 | 101500 | 100400 | 95500 |
| Flexural Strength | | 2240 | 2310 | 2230 | 2300 | 2330 | 2130 | 2100 | 2240 | 2150 | 1880 |
| Tensile Strength | 5.0 mm/min | 1750 | 1700 | 1680 | 1770 | 1740 | 1580 | 1610 | 1750 | 1670 | 1550 |
| Moisture Percentage (%) | 24 h (85° C., 85%) | 2.69% | 2.58% | 2.62% | 2.63% | 2.61% | 2.45% | 2.46% | 3.21% | 2.53% | — |
| | 48 h (85° C., 85%) | 2.35% | 2.50% | 2.45% | 2.36% | 2.41% | 2.41% | 2.46% | 2.88% | 2.44% | — |
| High-temperature weight loss rate (% by weight) | 350° C., 30 min | 6.3% | 6.7% | 7.1% | 6.3% | 6.2% | 6.9% | 7.0% | 5.9% | 7.1% | — |
| Flame Resistance | | V-0 | V-0 | V-0 | V-0 | V-0 | V-0 | V-0 | V-0 | V-0 | — |
| Frequency of Gas blister on surface | | | | | | | | | | | |
| 24 h (85° C., 85%) | | 2 | 2 | 3 | 2 | 2 | 4 | 4 | 5 | 2 | — |
| 48 h (85° C., 85%) | | 1 | 3 | 3 | 1 | 1 | 4 | 4 | 5 | 4 | — |

As shown in Table 2, the resin compositions of Examples 1 to 5 do not exhibit deteriorated mechanical properties such as impact strength, flexural modulus, flexural strength or tensile strength, and exhibit low moisture percentage and reduced gas blister occurrence on a specimen surface.

Specifically, as compared with Examples 1 to 5 which include glass fiber surface-treated with urethane compound, Comparative Example 5 which includes glass fiber surface-treated with a non-urethane compound exhibits deteriorated impact strength, flexural modulus, tensile strength and flexural strength. Also, other evaluations are not performed because the results are worse.

Compared with Examples 1 to 5 which include phosphite antioxidant (E), Comparative Examples 1 to 5 which do not include phosphite antioxidant (E) exhibit deteriorated moisture percentage and increased gas blisters on a specimen surface Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A flame retardant polyamide resin composition comprising:
   (A) about 40 to about 60% by weight of a crystalline polyamide resin;
   (B) about 10 to about 20% by weight of a polyphenylene sulfide resin;
   (C) about 5 to about 15% by weight of a phosphinic acid metal salt flame retardant;
   (D) about 20 to about 40% by weight of a glass fiber; and
   (E) about 0.1 to about 1% by weight of a phosphite antioxidant.

2. The flame retardant polyamide resin composition of claim 1, wherein the crystalline polyamide resin (A) is a semi-aromatic polyamide resin including benzene rings in a main chain thereof and having a melting point of about 290 to about 320° C.

3. The flame retardant polyamide resin composition of claim 1, wherein the crystalline polyamide resin(A) comprises polytetramethylene adipamide (PA 46), polycaproamide/polyhexamethylene terephthalamide copolymer (PA6/6T), polyhexamethylene adipamide/polyhexamethylene terephthalamide copolymer (PA66/6T), polyhexamethylene adipamide/polyhexamethylene isophthalamide copolymer (PA66/6I), polyhexamethylene terephthalamide/polyhexamethylene isophthalamide copolymer (PA6T/6I), polyhexamethylene terephthalamide/polydodecaneamide copolymer (PA6T/12), polyhexamethylene adipamide/polyhexamethylene terephthalamide/polyhexamethylene isophthalamide copolymer (PA66/6T/6I), polyxylylene adipamide (PA MXD6), polyhexamethylene terephthalamide/poly 2-methylpentamethylene terephthalamide copolymer (PA 6T/M5T), polynonamethylene terephthalamide (PA 9T) or a combination thereof.

4. The flame retardant polyamide resin composition of claim 1, wherein the polyphenylene sulfide resin (B) includes about 70 mol % or more of a repeating unit represented by following Chemical Formula 1:

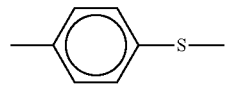

[Chemical Formula 1]

5. The flame retardant polyamide resin composition of claim 1, further comprises an additional flame retardant comprising an aromatic phosphoric acid ester compound, nitrogen-containing compound, nitrogen-phosphorous-containing compound, or a combination thereof.

6. The flame retardant polyamide resin composition of claim 1, wherein the glass fiber (D) is a circular glass fiber having an average diameter of about 9 to about 12 μm and an average length of about 2 to about 4 mm.

7. The flame retardant polyamide resin composition of claim 1, wherein the surface of glass fiber (D) is treated with a urethane compound.

8. The flame retardant polyamide resin composition of claim 1, wherein the phosphite antioxidant (E) comprises triphenyl phosphite, tris(nonyl phenyl) phosphite, triisodecyl phosphite, diphenyl-iso-octyl-phosphite, bis(2,6-di-tert-butyl-4-methyphenyl)pentaerythritol diphosphite, tris(2,4-di-tert-butylphenyl) phosphite or a combination thereof.

9. The flame retardant polyamide resin composition of claim 1, further comprising a phenol antioxidant.

10. The flame retardant polyamide resin composition of claim 1, further comprising an additive comprising a release agent, lubricant, compatibilizing agent, impact reinforcing agent, plasticizer, nucleating agent, colorant, or a combination thereof.

11. A molded article prepared from the flame retardant polyamide resin composition of claim 1.

12. The molded article of claim 11, wherein the molded article has a gas blister value on a surface of specimen thereof of 1 to 3, wherein the gas blister rating is measured after maintaining a 90 mm×50 mm×1 mm specimen at a temperature of 85° C. and a relative humidity of 85% for 24 hours or 48 hours measured in accordance with the IPC/JEDEC J-STD-020D standard for IR Reflow equipment.

* * * * *

UNITED STATES PATENT AND TRADEMARK OFFICE
CERTIFICATE OF CORRECTION

PATENT NO.         : 8,987,359 B2                                 Page 1 of 2
APPLICATION NO.    : 13/913796
DATED              : March 24, 2015
INVENTOR(S)        : Hyoung Taek Kang et al.

It is certified that error appears in the above-identified patent and that said Letters Patent is hereby corrected as shown below:

In the Specification

Column 4, Chemical Formula 4 at Lines 15-22 is depicted as:

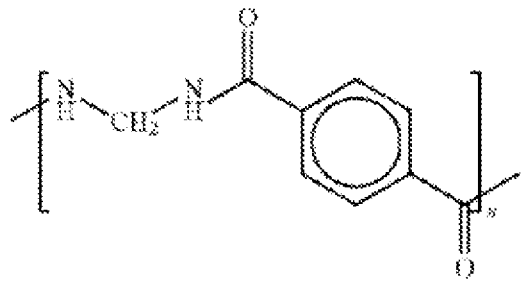

and should be depicted as:

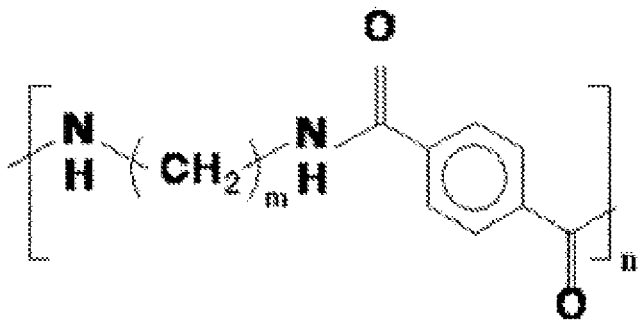

Column 4, Line 36 should read: "mide copolymer (PA6/6T), polyhexamethylene adipamide/"

Signed and Sealed this
Twentieth Day of October, 2015

Michelle K. Lee
*Director of the United States Patent and Trademark Office*

CERTIFICATE OF CORRECTION (continued)
U.S. Pat. No. 8,987,359 B2

In the Specification

Column 6, Chemical Formulas at Lines 10-14 are depicted as:

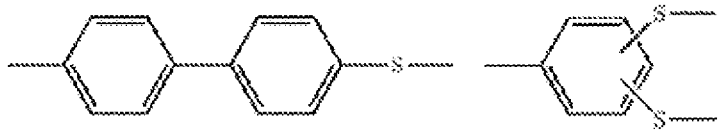

and should be depicted as:

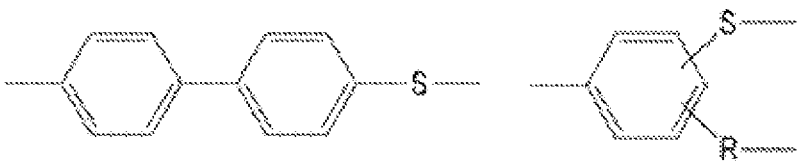

Column 7, Line 65 should read: "$R_6$, $R_7$, $R_9$ and $R_{10}$ are the same or different and are each"

Column 8, Line 13 should read: "nol A-bis (diphenylphosphate), resorcinol bis (2,6-ditertiary-"

Column 8, Line 14 should read: "butylphenylphosphate), hydroquinol bis (2,6-"